United States Patent [19]

James

[11] 4,455,812
[45] Jun. 26, 1984

[54] COMBINE DRIVE WITH DOUBLE CLUTCH ASSEMBLY

[75] Inventor: Larry R. James, Olathe, Kans.

[73] Assignee: Allis-Chalmers Corp., Milwaukee, Wis.

[21] Appl. No.: 460,487

[22] Filed: Jan. 24, 1983

[51] Int. Cl.³ .................... A01D 41/12; A01F 12/56
[52] U.S. Cl. .................... 56/11.5; 192/48.2;
192/48.8; 192/84 AA; 56/11.1; 56/11.7;
130/27 R
[58] Field of Search ............ 56/10.8, 10.9, 11.1,
56/11.3, 11.4, 11.5, 11.7, 14.6; 130/27 R;
192/48.2, 48.8, 84 AA

[56] References Cited

U.S. PATENT DOCUMENTS

| 3,375,738 | 4/1968 | Love | 130/27 R |
| 4,138,837 | 2/1979 | Love | 56/11.2 |
| 4,400,930 | 8/1983 | Huhman et al. | 56/11.6 |

FOREIGN PATENT DOCUMENTS 238553 12/1959 Australia .................... 56/11.5

Primary Examiner—Robert P. Swiatek
Assistant Examiner—David L. Tarnoff
Attorney, Agent, or Firm—Charles L. Schwab

[57] ABSTRACT

A self-propelled combine (11) includes a drive train driven by the engine (16) which includes a transverse power shaft (47) by which a header (24), a threshing rotor (34), a bin unloading mechanism (88), the change speed transmission (76) and the cleaning mechanism are driven. The power transmitting components of the shaft assembly, including a double electric clutch (44), are carried by the end portions (46, 161) of the transverse shaft (47) at the laterally outer sides of the side walls (51, 52) on which the shaft (47) is supported. The double electric clutch (44) includes air circulating means (101, 102 and 93-98) and is removable from the shaft (47) upon removal of a cap screw (118).

19 Claims, 5 Drawing Figures 4,455,812

COMBINE DRIVE WITH DOUBLE CLUTCH ASSEMBLY

BACKGROUND OF THE INVENTION

1. Technical Field

This invention relates to an agricultural combine and more particularly to the power drive train of the combine.

2. Prior Art

Heretofore the assignee of the present application has marketed combines having a power train including a transverse shaft assembly shown in FIG. 5 of the drawings hereof. In assignee's prior art construction a single electric clutch is interposed between a first end of the transverse shaft and a header driving pulley. A multiple V-belt grooved pulley is also drivingly secured to the first shaft end for a drive belt connection to the engine and in driving relation to a change speed transmission for propelling the combine. The other end of the transverse shaft carries a spring loaded variable pitch V-belt sheave for driving the threshing cylinder and also carries sheaves for driving the separation mechanism, a straw chopper and a bin unloading mechanism. An electric clutch is disposed between the other shaft end and the variable V-belt sheave. In this prior construction the transverse shaft rotates not only during threshing but also during nonthreshing modes of operation as when roading from one location to another or when unloading grain.

OBJECTS AND SUMMARY OF THE INVENTION

It is an object of the present invention to provide an improved power train for a combine wherein a transverse shaft transferring power from one side of the combine to the other has all its power transmitting components mounted on laterally opposite shaft end portions extending laterally beyond the combine side walls and the shaft is rotated only when the threshing and cleaning sections of the combine are operating.

More specifically, it is an object of the present invention to provide a one-piece shaft supported on the laterally opposite side walls of the combine which has a double clutch assembly at one end driven by the engine and which has a variable pitch sheave for driving the threshing cylinder at the other end wherein the sheaves and the clutch assembly associated with the shaft are disposed on the laterally outer sides of the combine side walls.

It is a further object of the present invention to provide a double clutch assembly at one end of a transverse shaft of a combine power train which is disposed on the laterally outer side of a combine side wall and includes an annular housing serving as a multiple belt sheave for receiving power from the engine, for driving the change speed transmission and for driving the bin unloading mechanism.

It is a further object of the present invention to provide an annular clutch housing of the type hereinbefore outlined which includes means for expelling dirt from the clutch area.

The present invention finds particular utility in a self-propelled combine of the type having a frame at least partially supported by ground engaging drive means driven by an engine mounted on the frame through a power train which includes a change speed transmission having rotary input and output shafts. The rotary output shaft is connected in a conventional manner to the ground engaging drive means which may take the form of wheels. The combine in which the present invention finds utility includes a cleaning mechanism, a bin unloading mechanism, a header mechanism and a threshing mechanism having a rotor. Each of the mentioned mechanisms is driven through a rotary input element or member. The combine has a pair of laterally spaced upright side walls on the frame at laterally opposite sides of the combine between which a horizontally transverse power transmitting shaft extends. Opposite end portions of the power shaft extend beyond the laterally outer sides of the side walls and a pair of bearing means rotatably mount laterally spaced portions of the shaft on the side walls, respectively. The invention includes a variable pitch V-belt sheave nonrotatably and coaxially mounted on one of the end portions of the shaft at the laterally outer side of one of the side walls and power transmitting means between the variable pitch sheave and the threshing rotor including a V-belt in driven engagement with the variable pitch V-belt sheave. A double electric clutch assembly is operatively associated with the other end portion of the shaft at the laterally outer side of the other side wall and includes an annular clutch housing concentric with the shaft having a hub portion rotatably mounted on the other end portion of the shaft, a cylindrical rim portion presenting at least one V-belt groove and a disk portion rigidly connected at its radially inner part to the hub and at its radially outer part to the rim portion. A first electric clutch is disposed in the annular housing and is selectively operable to secure the annular housing to the power shaft. A belt sheave for driving the header mechanism is rotatably mounted on the combine in coaxial relation to the shaft and is disposed laterally between the other side wall and the annular housing. A second electric clutch is disposed within the annular housing and is selectively operable to secure the annular housing to the header belt sheave. Completing the novel combination are power transmitting means connecting the engine to the annular housing including a V-belt in power transmitting engagement with the V-belt groove and power transmitting means interconnecting the header belt sheave to the rotary input component of the drive train for the header mechanism including a belt cooperatively engaging the header belt sheave.

BRIEF DESCRIPTION OF THE DRAWINGS

One embodiment of the invention and a prior art construction are illustrated in the drawings in which.

DETAILED DESCRIPTION OF THE DRAWINGS

Figure 1:
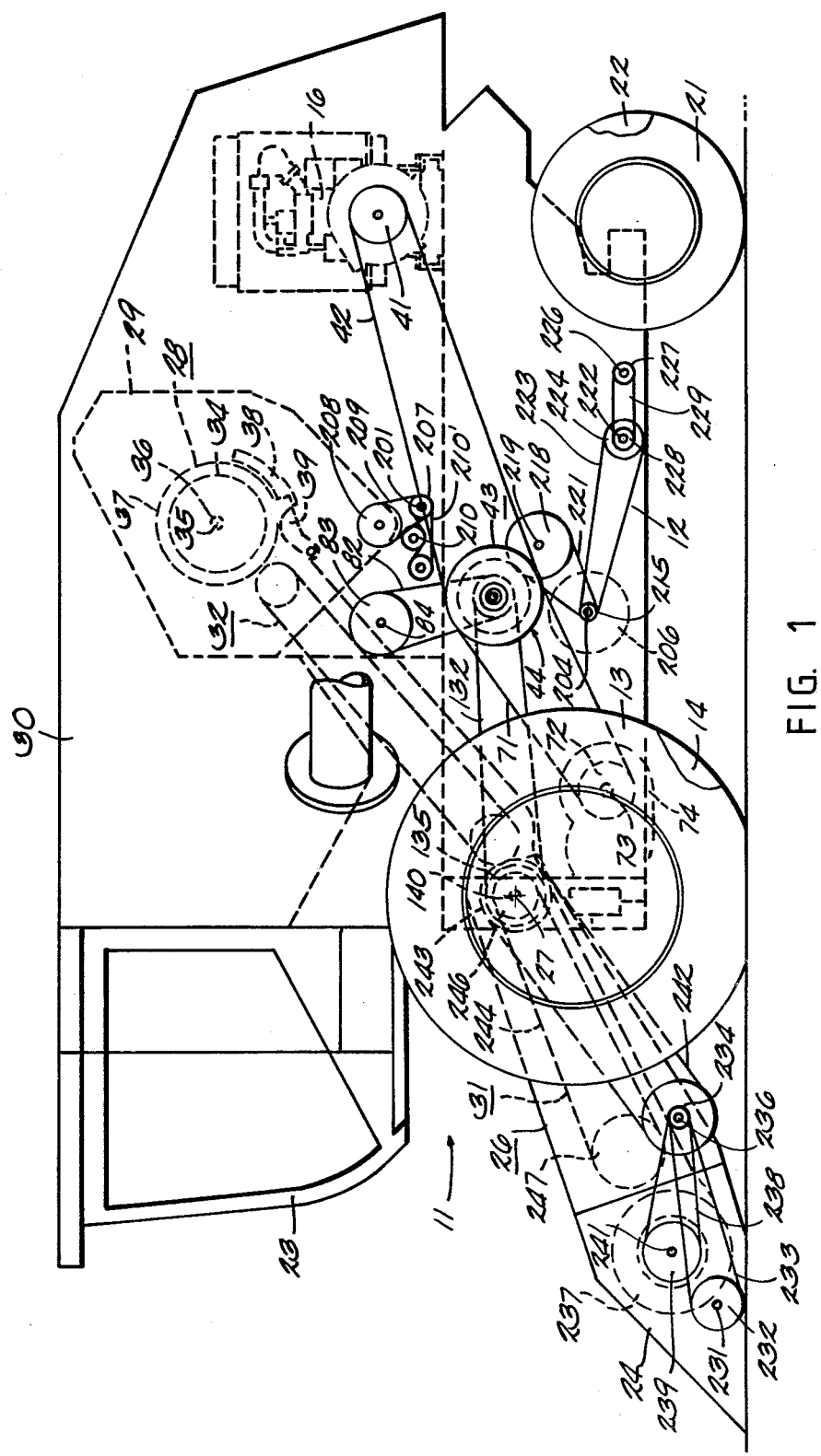
FIG. 1 is a left-hand side view of the combine in which the present invention is incorporated.
Figure 2:
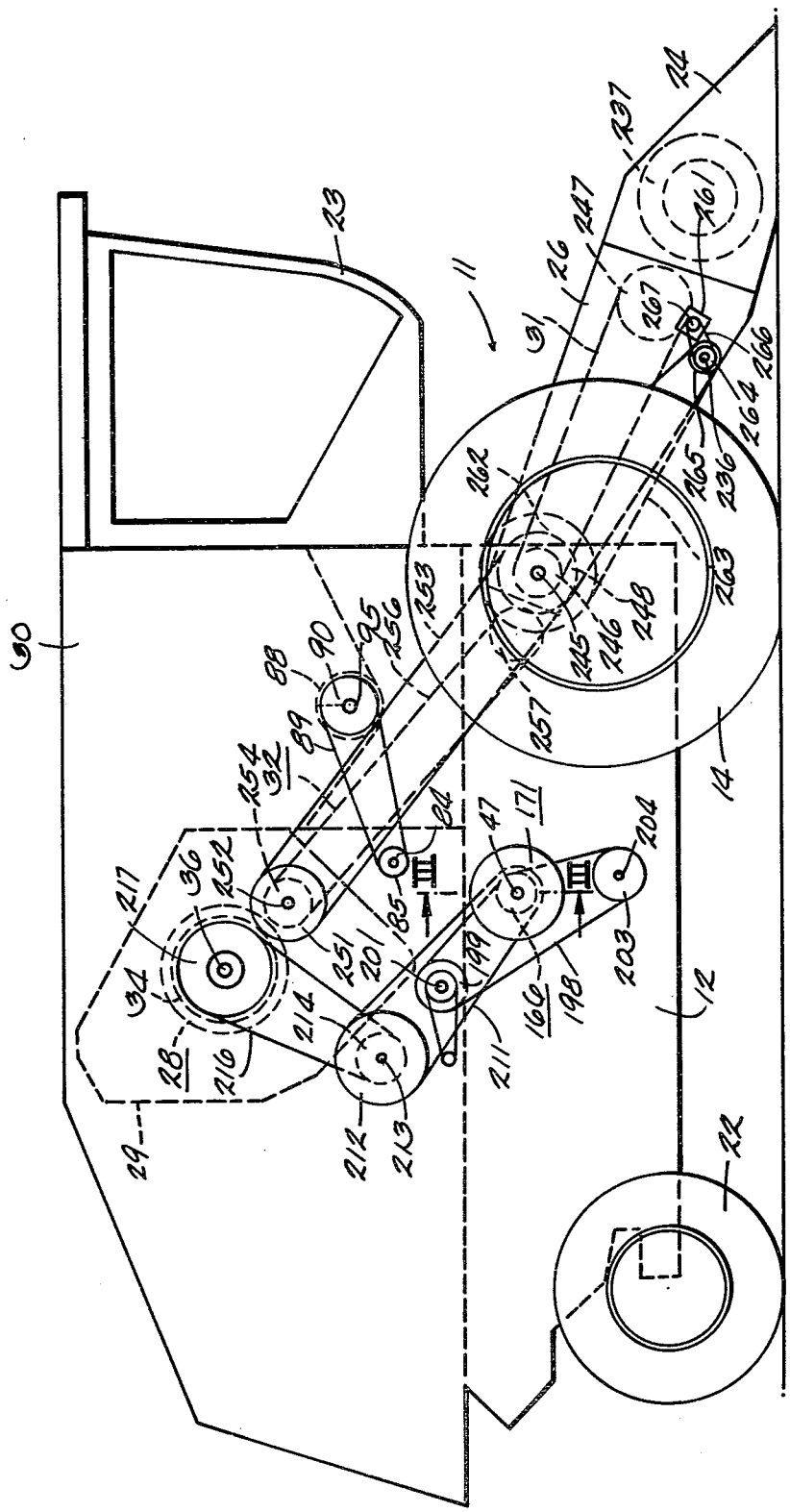
FIG. 2 is a right-hand side view of the combine shown in FIG. 1.

As shown in FIGS. 1 and 2, the combine 11 in which the present invention is incorporated includes a main frame 12 having a pair of drive wheels 13, 14 at its front end which are driven by an engine 16 through a power train which will be hereinafter described. A pair of steerable rear wheels 21, 22 support the rear of the main frame 12 and an operator's station or cab 23 is mounted on the front of the main frame 12 between the front drive wheels 13, 14 in an elevated position above the header mechanism 24 and the feeder housing 26. The front end of the feeder housing 26 is secured to the header mechanism 24 and its rear end is pivotally connected to the main frame 12 for vertical swinging movement about a horizontal transverse axis 27. A crop processor 28 is positioned on the frame 12 in a housing 29 behind a grain bin 30 and receives crop material from the lower feed conveyor 31 by way of an upper feed conveyor 32. The processor 28 includes a threshing rotor 34 which rotates about a transverse axis 35 of its shaft 36 within a perforated cage 37 having a concave 38 and a rock door 39. The engine 16 drives a belt pulley 41 with which an endless V-belt 42 is engaged. The V-belt 42 is reeved about and drives a clutch housing 43 of a double electric clutch assembly 44.

Figure 3:
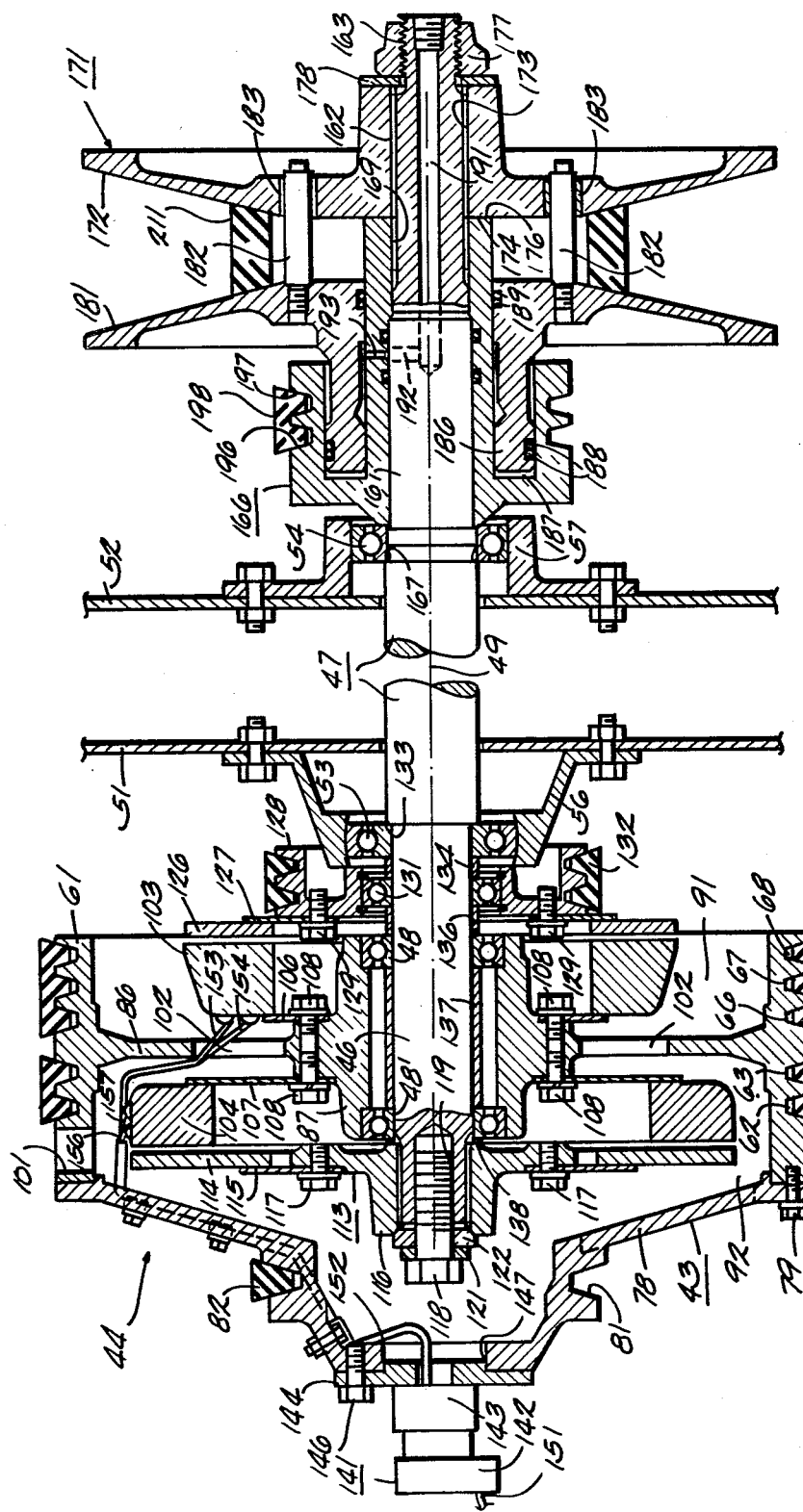
FIG. 3 is a view taken along the line III—III in FIG. 2 showing a transverse power shaft with a double clutch assembly at one end.
Figure 4:
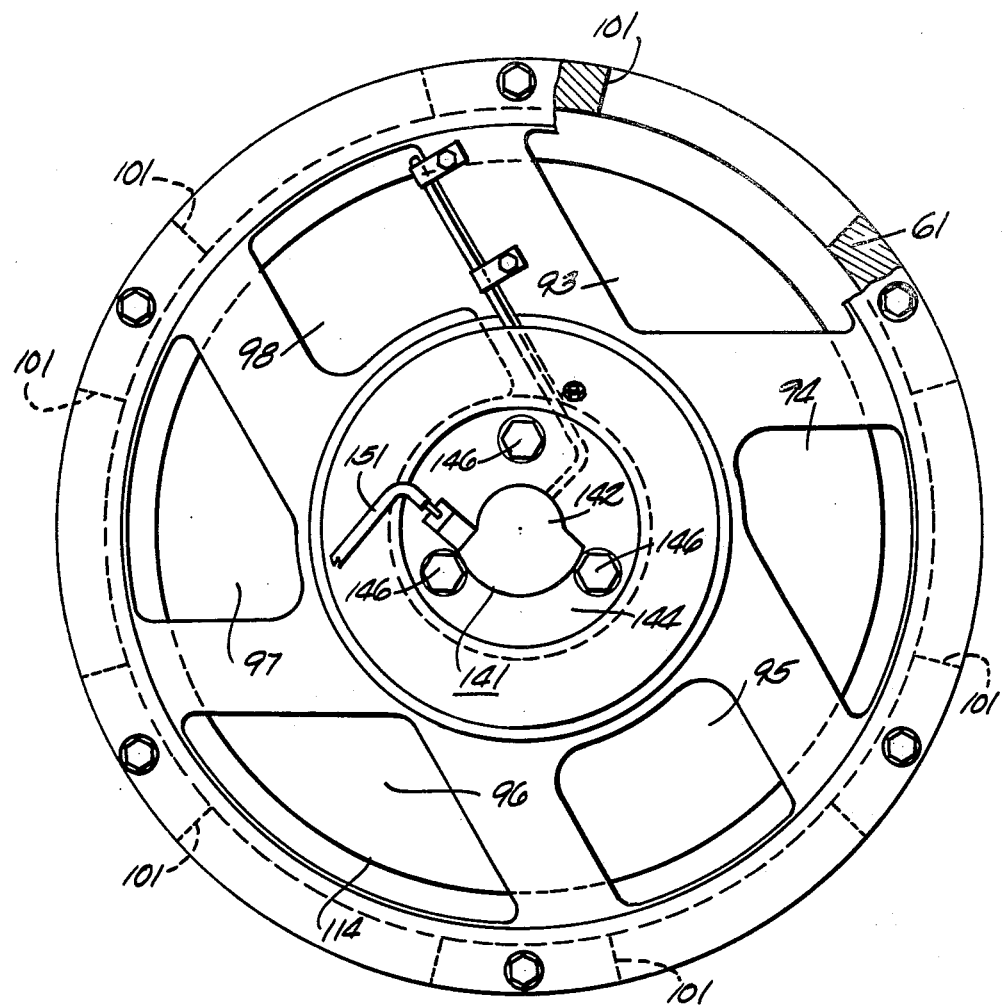
FIG. 4 is an end view of the double clutch assembly of FIG. 3.

Referring also to FIG. 3, the annular clutch housing 43 is coaxially mounted on a reduced diameter, laterally outer end portion 46 of a horizontal, transverse power transmitting shaft 47 by a pair of axially spaced ball bearings 48, 48' for rotation about the axis 49 of the shaft 47. The shaft 47 is rotatably mounted on the side walls 51, 52 of the combine by antifriction bearings 53, 54 supported on the walls by brackets 56, 57. The exterior of periphery of the clutch housing 43 serves as V-belt pulley means of three V-belts. More specifically, the rim portion 61 of the housing provides three V-belt grooves 66, 67, 68 drivingly engaged by the engine driven belt 42 and two V-belt grooves 62, 63 drivingly engaging an endless V-belt 71 which drivingly engages a V-belt pulley 72 nonrotatably secured to the input shaft 73 of a change speed transmission 74 whose output shaft, not shown, is connected to the drive wheels 13, 14 by suitable final drive gearing, not shown. As annular end cover 78 releasably secured to the lateral outer end of the rim portion 61 by cap screws 79 presents a V-belt groove 81 concentric with grooves 62, 63, 66, 67, 68 and shaft 47. The groove 81 drivingly engages an endless V-belt 82 which drives a pulley 83 nonrotatably secured to a bin unloader jack shaft 84. The right-hand end of the jack shaft 84, as shown in FIG. 2, has a sprocket 85 secured thereto which drives a bin unloading auger 88 of the bin unloading mechanism through an endless chain 89 and a sprocket 90 on the end of the auger shaft 95. A disk portion 86 of the housing 43 rigidly interconnects the rim portion 61 with a hub portion 87. The disk portion 86 at its radially outer part joins the rim portion intermediate its axially opposite ends and at the radially inner side thereof to define a pair of laterally inner and outer cavities or pockets 91, 92. Inner pocket 91 is laterally inwardly open whereas outer pocket 92 is partially closed by the cover 78 which is provided with a plurality of axial openings or air passages, 93, 94, 95, 96, 97, 98, as shown in FIG. 4. The rim portion 61 is provided with a plurality of radial air passages or openings 101 and the disk portion has axial air passages or openings 102. A pair of electric clutch coils 103, 104 are secured to disks 106, 107 which are secured to the hub portion 87 by cap screws 108. A clutch plate assembly 113 includes an annular plate 114 of ferromagnetic material in axially confronting relation to the electric coil 104, a hub 116 having an internally splined opening which has a splined fit with an externally splined laterally outer end of the end portion 46 of the shaft 47 and a plurality of flexible flat radial spokes 115 welded to the clutch plate 114 and releasably fastened to the hub 116 by cap screws 117. The hub 116 is held on the shaft 47 by a cap screw 118 whose threaded shank is releasably threaded into a threaded axial passage 119. Appropriate washers 121, 122 are interposed between and in thrust transmitting engagement with the head of the cap screw 118 and the hub 116. A second clutch plate 126 of ferromagnetic material is disposed in axially confronting relation to the electric clutch coil 103 and includes a plurality of radially inwardly extending relatively thin resilient spokes 127 secured to a header driving pulley 128 by cap screws 129. The pulley 128 is rotatably supported on the end portion 46 of the shaft 47 by an antifriction bearing 131 and is positioned laterally between the combine side wall 51 and the clutch housing 43. A belt 132 drivingly connects the pulley 128 to a pulley 135 secured to a transverse shaft 140 on the pivot axis 27.

It will be noted that the inner raceway of the shaft bearing 53 bears axially against a laterally outwardly facing shoulder 133 on the shaft 47 and spacers 134, 136 and 137 encircling the reduced diameter portion 46 of the shaft 47 serve to axially position the inner raceways of bearings 53, 131, 48, 48' relative to one another and serve as axial thrust transmitting members therebetween. A thrust transmitting member in the form of a thrust washer 138 is interposed axially between the clutch plate hub 116 and the inner raceway of bearing 48'.

The coils 103, 104 of the electric clutches are supplied electric current by electric circuit means which includes a slip ring type rotary electrical connector 141 which includes a stationary part 142 and a part 143 which is secured to an end cap 144 which rotates with the clutch housing 61. The end cap is releasably secured to the cover portion 78 of the clutch housing 61 by cap screws 146 in covering relation to an annular axial opening 147 in the cover portion 78 aligned with the cap screw 118 and shaft 47. A suitable three wire conduit 151 is connected at one end to the connector part 142 and its other end is connected to suitable controls, not shown, at the operator's station by which the operator selectively energizes one or the other or both coils 103, 104. A multiple wire conduit 152 connected to part 143 of the rotary electrical connector 141 includes a pair of leads or insulated wires 153, 154 electrically connected to coil 103 and a pair of leads 156, 157 electrically connected to coil 104. The slip ring connector has three slip rings, one slip ring serving to connect a single negative wire of conduit 151 with two negative leads of conduit 152. It will be noted the leads 153, 154 pass through an axial opening 102 in the housing 61.

Referring to the right-hand side of FIG. 3, the shaft 47 has a reduced diameter end portion 161 with an externally splined intermediate part 162 and an externally threaded end 163. A combined V-belt sheave and hydraulic cylinder 166 has an axially or laterally inward end in axially abutting relation to the inner raceway of bearing 54 which in turn is in axial abutment with a shoulder 167 on the shaft 47. The cylinder 166 includes an internally splined bore 169 nonrotatably engaging the splined part 162 of the end portion 161 of the shaft 47. A variable pitch V-belt sheave 171 is releasably installed on the end portion 161 of the shaft 47 extending laterally beyond the right side wall 52 of the combine. The variable pitch sheave 171 includes a right sheave half 172 with a splined bore 173 in nonrotatable engagement with the splined part 162 of the shaft 47. The laterally inner end face 174 of the right sheave half 172 is in axial abutment with the laterally outer end surface 176 of the cylinder 166. The cylinder 166 and right sheave half 172 are releasably secured to the reduced diameter end portion 161 of the shaft 47 by a nut 177 in threaded engagement with the threaded end 163 of the shaft, the nut 177 being in axial thrust transmitting engagement with a thrust washer 178 which in turn axially abuts the laterally outward end of the right sheave half 172. The variable pitch sheave 171 includes an axially shiftable left sheave half 181 which carries a plurality of axially extending cylindrical pins 182 in sliding engagement with aligned sleeves 183 in the right sheave half 172. Thus, the pins 182 connect the left half 181 in nonrotatable, but axially shiftable, relation to the right sheave half 172. The left sheave half 181 includes a cylindrically shaped piston 186 in operative engagement with cylindrical surfaces defining a complementary cylindrical cavity 187 of the cylinder 166. O-rings 188, 189 provide fluid sealing between the relatively reciprocating cylinder and piston surfaces. The pitch of the variable pitch sheave is controlled by the operator at the operator's station 23 through manually operated controls, not shown, which direct pressure fluid to the hydraulic actuator comprised of the cylinder 166 and the piston 186 via internal passages 191, 192 in the shaft 47 and a radial passage 193 in the cylinder. V-belt grooves 196, 197 in the cylinder 166 provide a V-belt pulley for driving an endless V-belt 198 which drivingly engages a pulley 199 nonrotatably secured to a transverse shaft 201 of the rear accelerator roll of the grain cleaning mechanism. The belt 198 also drivingly engages a pulley 203 on the transverse shaft 204 of a fan 206 providing air for the combine cleaning mechanism. At the left-hand side of the combine, as shown in FIG. 1, the sheave 207 on the shaft 201 drives a distribution auger pulley 208 through belt 209 and a front accelerator roll sprocket 210 through an endless chain 210'. A sprocket 215 on the left end of the shaft 204, as shown in FIG. 1, drives a sprocket 218 secured to a cleaning shoe eccentric shaft 219 through a chain 221 and a sprocket, not shown, on the shaft 204 drives a clean grain conveyor shaft 222 through an endless chain 223 engaging a sprocket 224 on the shaft 222. A tailings conveyor shaft 226 carries a sprocket 227 driven by a sprocket 228 on the shaft 222 through an endless chain 229. Shaft 226 also drives a straw spreader, not shown, through a drive train, not shown. The variable pitch sheave 171 is part of a variable speed V-belt drive which includes a V-belt 211 in driving engagement with a variable pitch sheave 212, shown in FIG. 2. The variable pitch sheave 212 is nonrotatably connected to a transverse shaft 213 to which a belt pulley 214 is coaxially secured. The belt pulley 214 drives the rotor 34 of the separator mechanism through a belt 216 reeved about a pulley 217 nonrotatably secured to the rotor shaft 36.

Referring to FIG. 1, the wobble drive shaft 231 of the cutter mechanism carries a pulley 232 which is driven by a belt 233 reeved about a multiple groove pulley 234 secured to a transverse shaft 236. The pulley 234 also drives the header auger 237 through a belt 238 reeved about the pulley 234 and a pulley 239 on the auger shaft 241. The shaft 236 is driven by a belt 242 reeved about a pulley 243 on the transverse shaft 140. Referring to FIG. 2, the lower feeder conveyor 31 includes an endless chain and slat mechanism 244 driven by an upper drive drum 246 on a shaft 245 and traveling about a lower idler drum 247. The shaft 245 is driven by shaft 236 through a belt 263 engaging a pulley 262 on the shaft 245 and a pulley 265 on the shaft 236. A pulley 248 on the right-hand end of the shaft 245 drives a pulley 251 on an upper feeder conveyor drive shaft 252 through a belt 253. The shaft 252 carries a drive drum 254 for the upper feeder conveyor 32 which includes an endless chain and slat mechanism 256 driven by the drum 254 and traveling about a lower idler drum 257. A hydraulic pump 261 is driven by a short belt 266 engaging a pulley 264 on the shaft 236 and a pulley 267 on the pump 261. The pump 261 supplies the hydraulic fluid for controlling the position of a reel, not shown.

DESCRIPTION OF PRIOR ART

Figure 5:
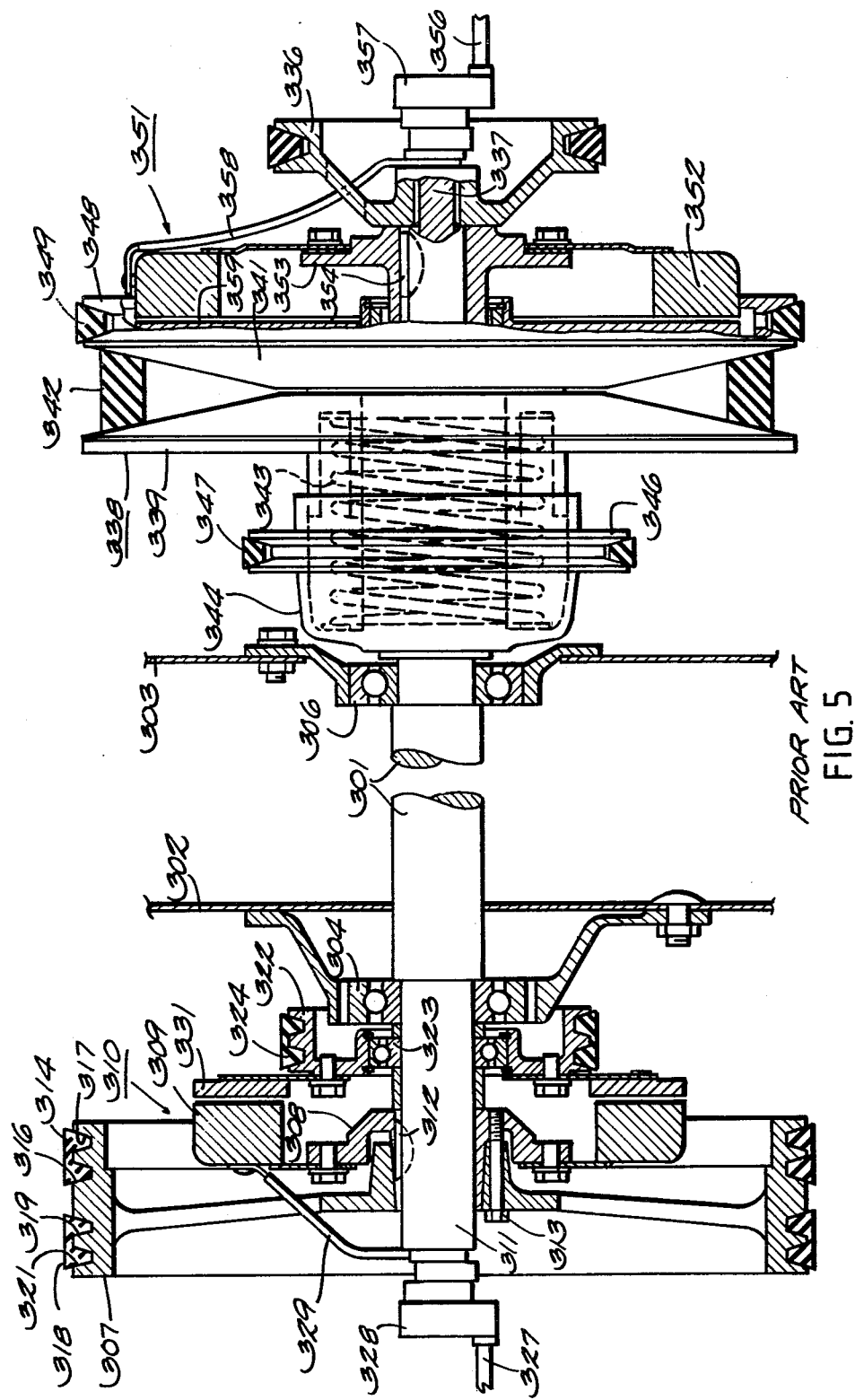
FIG. 5 is a vertical transverse section of a transverse power shaft of a prior art combine.

A prior art transverse power shaft arrangement for a combine is shown in FIG. 5. In this prior art arrangement, a transverse shaft 301 is rotatably mounted on the combine sidewalls 302, 303 by antifriction bearings 304, 306. A V-belt pulley 307 and a hub 308 supporting a clutch coil 309 of an electric clutch 310 are secured for rotation with an end 311 of the shaft 301 by a key 312 and cap screws 313 interconnecting the parts 307, 308. An engine driven V-belt 314 engages grooves 316, 317 of the pulley 307 and a V-belt 318 engaging grooves 319, 321 transmits power to the change speed transmission of the combine propelling drive train. A V-belt pulley 322 is rotatably supported on the end 311 of the shaft 301 by an antifriction bearing 323 and includes grooves engaged by V-belt 324 connected to the combine header mechanism. When the coil 309 is electrically energized through lead 327, rotary electric coupling 328 and lead 329, a clutch plate 331 is drawn into frictional, driven engagement with the coil 309 thereby driving the header pulley 322 and belt 324.

A sheave 336 is splined to the other end 337 of the shaft 301 and drivingly engages a V-belt connected to a bin unloading mechanism. A variable pitch V-belt sheave 338 is rotatably mounted on the end portion 337 of the shaft 301 with sheave halves 339, 341 in driving engagement with a V-belt 342. Sheave half 339 is biased toward sheave half 341 by a coil spring 343. A second variable pitch sheave, not shown, on a shaft parallel to shaft 301 has a pair of sheave halves engaging belt 342 which are axially shifted relative to one another by a mechanical actuator. A cylindrical part 344 secured for rotation with the sheave half 341 includes a pulley 346 driving a V-belt 347 which in turn drives the combine separator mechanism. A pulley 348 formed on variable pitch sheave half 341 drives a V-belt 349 drivingly engaging a straw chopper. The variable pitch sheave 338 is selectively driven by the shaft 301 through an electric clutch 351 which includes a coil 352 secured to a hub 353 fastened to the shaft end 337 by a key 354. Upon energization of the coil 352 through electric lead 356 rotary electric coupling 357 and lead 358, the coil 352 frictionally engages a clutch plate 359 on the sheave half 341 to cause the sheave 338 to rotate with the transverse shaft.

In operating a combine with this prior art transverse shaft arrangement, the shaft 301 must rotate not only when the threshing and separating mechanisms are driven but also whenever power is transmitted by the engine to the pulley 307 for any reason, such as to cause travel of the combine, to cause the header to operate, and to operate the bin unloader. Also locating an electric clutch on the end of the shaft 301 on which the variable pitch sheave is located requires a separate rotary electric coupling, which from a practical standpoint is placed on the outer end of the shaft end 337. This virtually dictates against hydraulically actuating the driving variable pitch sheave because of the problems of placing both a rotary hydraulic coupling and a rotary electric coupling on the same end of the shaft. Consequently in the prior art shaft arrangement the driving variable pitch sheave is spring loaded rather than being hydraulically actuated in accordance with the prevailing practice in variable pitch drive installations.

OPERATION AND ADVANTAGES

The present invention, shown in FIGS. 1-4, has advantages over the prior art arrangement shown in FIG. 5. The prior art electric clutches 310, 351 are on opposite ends of the shaft 301 thereby requiring two rotary electric connectors 328, 357. In the present invention the electric clutches are mounted on a single drive pulley and are electrically energized through a single rotary electric connector 141. Removing the rotary electric connector from the variable pitch sheave end of the shaft facilitates hydraulically actuating the variable pitch sheave which is preferred because it is a driving sheave. All components supported on the left end portion 46 of the shaft 47 can be removed by taking off the end cap 144 (by removing cap screws 146) and then removing cap screw 118 (by inserting a wrench through the opening 147). This greatly facilitates assembly, disassembly and repair or replacement of components if required. Repair or replacement of the double clutch components can be achieved in minimal time because of the excellent accessibility. This reduces down time, which harvester owners want to minimize - particularly during the harvesting season.

The outer electric clutch 104, 114 is readily accessible for repair and replacement by virtue of the removable cover 78. The coil and plate components 104, 114 are removable upon removing the cover 78, the cap screw 118, the cap screws 117 and the cap screws 108.

During a harvesting operation, the radial openings 101 in the rotating clutch housing 43 act as a centrifugal fan or air pump to draw air through openings 102 from pocket 91 in which the clutch coil 103 is located. Also, air is drawn through end cover openings 93–98 and exhausted by centrifugal action through openings 101. This flow of air cools the electric coils 103, 104 and the clutch plates 114, 126 and also prevents excess accumulation of dust thereon.

In the present invention the transverse shaft is not driven when the combine is merely traveling to or from fields being harvested or when grain is unloaded from the grain bin or when only the header is operated. Thus, the operating life of the bearings supporting the shaft is expected to be significantly extended. In the prior art construction the transverse shaft rotates during combine travel, during unloading of the bin and when the header is operated in addition to times when threshing operations are performed.

The embodiments of the invention in which an exclusive property or privilege is claimed are defined as follows:

1. In a self-propelled combine having a frame at least partially supported by ground engaging drive means, an engine mounted on said frame, a change speed transmission having a rotary input shaft and a rotary output shaft connected in driving relation to said ground engaging drive means, a cleaning mechanism driven by a rotary input element, a grain bin and a bin unloading mechanism driven by a rotary input member, the combination comprising:

a header mechanism driven by a rotary input component, a threshing mechanism having a rotor, a pair of laterally spaced upright side walls on said frame at laterally opposite sides of said combine, a horizontal, transverse power transmitting shaft extending between said walls with opposite end portions extending beyond the laterally outer sides of said walls, a pair of bearing means rotatably mounting laterally spaced portions of said shaft on said walls, respectively, a variable pitch V-belt sheave nonrotatably mounted on one of said end portions of said shaft at the laterally outer side of one of said walls, power transmitting means between said variable pitch V-belt sheave and said rotor including a V-belt in driven engagement with said variable pitch V-belt sheave, a double clutch assembly operatively associated with the other end portion of said shaft at the laterally outer side of the other of said side walls including an annular housing concentric with said shaft having
      a hub portion rotatably mounted on said other end portion of said shaft,
      a cylindrical rim portion presenting at least one V-belt groove, and
      a disk portion rigidly connected at its radially inner part to said hub and at its radially outer part to an axially intermediate and radially inner defining a laterally inner pocket and a laterally outer pocket, a first power operated clutch in said laterally outer pocket selectively operable to drivingly connect said annular housing to and to disconnect said annular housing from said shaft, a header belt sheave rotatably mounted on said combine in coaxial relation to said shaft and laterally between said other side wall and said annular housing, and a second power operated clutch in said laterally inner pocket selectively operable to drivingly connect said annular housing to and to disconnect said annular housing from said belt sheave, power transmitting means connecting said engine to said annular housing including a V-belt in power transmitting engagement with said V-belt groove, and power transmitting means interconnecting said header belt sheave to said header mechanism including a belt operatively engaging said belt sheave.

2. The combination of claim 1 wherein said annular housing includes at least one additional V-belt groove concentric therewith and further comprising power transmitting means operatively interconnecting said housing and said rotary input shaft of said change speed transmission including a V-belt engaging said at least one additional V-belt groove.

3. The combination of claim 2 wherein said at least one additional V-belt groove is in said rim portion.

4. The combination of claim 1 wherein said annular housing includes an annular end cover fixedly secured to the axially outer part of said rim portion in covering relation to said laterally outer pocket, and further comprising a V-belt pulley on said cover concentric with said housing and power transmitting means operatively interconnecting said annular housing in driving relation to said rotary input member of said bin unloading mechanism including a V-belt operatively engaging said V-belt pulley.

5. The combination of claim 4 wherein said annular housing includes at least one additional V-belt groove concentric therewith and further comprising power transmitting means operatively connecting said annular housing in driving relation with said input shaft of said change speed transmission including a V-belt operatively engaging said at least one additional V-belt groove.

6. The combination of claim 5 and further comprising a drive pulley nonrotatably secured to said one end portion of said shaft and power transmitting means operatively interconnecting said drive pulley in driving relation to said rotary input element of said cleaning mechanism including an endless belt operatively engaging said drive pulley.

7. The combination of claim 6 wherein said variable pitch V-belt sheave includes a first half secured to said shaft and a second half shiftable axially relative to said shaft, and further comprising a linear hydraulic actuator concentric with said shaft for shifting said second half including a piston element formed on said second half and a cylinder element secured to said shaft, said drive pulley being formed integrally with said cylinder element.

8. The combination of claim 1 wherein said header belt sheave is rotatably mounted on said shaft.

9. In a self-propelled combine having a frame at least partially supported by ground engaging drive means, an engine mounted on said frame, and a change speed transmission having a rotary input shaft and a rotary output shaft connected in driving relation to said ground engaging drive means, the combination comprising:
 a cleaning mechanism driven by a rotary input element,
 a grain bin,
 a bin unloading mechanism driven by a rotary input member,
 a header mechanism driven by a drive train including a rotary input component,
 a threshing mechanism having a rotor,
 a pair of laterally spaced upright side walls on said frame at laterally opposite sides of said combine,
 a horizontal, transverse power transmitting shaft extending between said walls with opposite end portions extending beyond the laterally outer sides of said walls,
 a pair of bearing means rotatably mounting laterally spaced portions of said shaft on said walls, respectively,
 a variable pitch V-belt sheave nonrotatably and coaxially mounted on one of said end portions of said shaft at the laterally outer side of one of said walls,
 power transmitting means between said variable pitch sheave and said rotor including a V-belt in driven engagement with said variable pitch V-belt sheave,
 a V-belt pulley nonrotatably secured to said one end portion of said shaft in axially spaced relation to said variable pitch V-belt sheave,
 power transmitting means operatively connecting said V-belt pulley to said rotary input element of said cleaning mechanism including a V-belt in driving engagement with said V-belt pulley,
 a double electric clutch assembly operatively associated with the other end portion of said shaft at the laterally outer side of the other of said side walls including
  an annular clutch housing concentric with said shaft having
   a hub portion rotatably mounted on said other end portion of said shaft, and
   an exterior portion presenting first, second and third V-belt grooves concentric to said shaft,
  a first electric clutch disposed in said annular housing selectively operable to secure said annular housing to said shaft,
  a header belt sheave rotatably mounted on said combine in coaxial relation to said shaft and laterally between said other side wall and said annular housing, and
  a second electric clutch disposed in said annular housing selectively operable to secure said annular housing to said header belt sheave,
 power transmitting means connecting said engine to said annular housing including a V-belt in power transmitting engagement with said first of said V-belt grooves,
 power transmitting means connecting said annular housing to said rotary input shaft of said transmission including a V-belt in driven engagement with said second of said V-belt grooves,
 power transmitting means connecting said annular housing to said rotary input member of said bin unloading mechanism including a V-belt in driven engagement with said third of said V-belt grooves, and
 power transmitting means interconnecting said header belt sheave to said rotary input component of said drive train for said header mechanism including a belt operatively engaging said belt sheave.

10. The combination of claim 9 wherein said annular housing includes a disk portion rigidly interconnecting said exterior and hub portions and defining therewith a pair laterally inner and outer pockets and wherein said first electric clutch is in said laterally outer pocket and said second electric clutch is in said laterally inner pocket.

11. The combination of claim 10 wherein each of said electric clutches includes an annular electric coil and wherein said electric coils are secured to and disposed, respectively, on opposite lateral sides of said disk portion.

12. The combination of claim 11 wherein said first electric clutch includes an annular clutch plate nonrotatably and releasably secured to the axially outer end of said second end portion of said shaft and said second electric clutch includes an annular clutch plate on said header belt sheave.

13. In a self-propelled combine having a frame at least partially supported by ground engaging drive means, an engine mounted on said frame, and a change speed transmission having a rotary input shaft and a rotary output shaft connected in driving relation to said ground engaging drive means, the combination comprising:

a header mechanism driven by a drive train including a rotary input component, a threshing mechanism having a rotor, a pair of laterally spaced upright side walls on said frame at laterally opposite sides of said combine, a horizontal, transverse power transmitting shaft extending between said walls with opposite end portions extending beyond the laterally outer sides of said walls, a pair of bearing means rotatably mounting laterally spaced portions of said shaft on said walls, respectively, a V-belt sheave nonrotatably and coaxially mounted on one of said end portions of said shaft at the laterally outer side of one of said walls, power transmitting means between said V-belt sheave and said rotor including a V-belt in driven engagement with said V-belt sheave, a double electric clutch assembly operatively associated with the other end portion of said shaft at the laterally outer side of the other of said side walls including an annular clutch housing concentric with said shaft having a hub portion rotatably mounted on said other end portion of said shaft, a cylindrical rim portion presenting at least one V-belt groove, and a disk portion rigidly connected at its radially inner part to said hub and at its radially outer part to said rim portion, a first electric clutch disposed in said annular housing selectively operable to secure said annular housing to said shaft, a header belt sheave rotatably mounted on said combine in coaxial relation to said shaft and laterally between said other side wall and said annular housing, and a second electric clutch disposed in said annular housing selectively operable to secure said annular housing to said header belt sheave, power transmitting means connecting said engine to said annular housing including a V-belt in power transmitting engagement with said V-belt groove, and power transmitting means interconnecting said header belt sheave to said rotary input component of said drive train for said header mechanism including a belt operatively engaging said belt sheave.

14. The combination of claim 13 wherein said disk and rim portions of said annular housing define laterally inner and outer pockets at laterally opposite sides, respectively, of said disk portion, and wherein said first and second electric clutches are disposed in said outer and inner pockets, respectively.

15. The combination of claim 14 wherein each of said electric clutches includes an annular electric coil nonrotatably secured to said housing.

16. The combination of claim 15 and further comprising axial openings in said disk portion of said housing and a plurality of circumferentially spaced radial openings in said rim portion, said radial openings functioning as a centrifugal air pump during rotation of said housing to induce air flow through said axial openings.

17. The combination of claim 13 wherein said annular housing includes an annular end cover secured to the laterally outer end of said rim portion and further comprising a source of electric current and electric conducting means for individually supplying said electric current to said electric clutches including a rotary electrical connector having a cap part secured coaxially to the laterally outer part of said end cover for rotation with the latter.

18. The combination of claim 17 and further comprising radial openings in said rim portion and axial openings in said disk portion and in said end cover, said radial openings functions as a centrifugal air pump during rotation of said housing thereby inducing air flow through said annular housing to prevent accumulation of dust and to effect cooling of said clutches.

19. The combination of claim 17 wherein said end cover includes a central axial opening aligned with said shaft, said cap part is releasably secured in covering relation to said central axial opening by releasable fastening means, said clutch assembly is releasably maintained on said other end portion of said shaft by releasable fastening means including a removable element on the laterally outer end of said other end portion, said removable element being removable by a tool inserted through said central axial opening after removal of said cap part.

* * * * *

UNITED STATES PATENT OFFICE
CERTIFICATE OF CORRECTION

Patent No. 4,455,812                     Dated June 26, 1984

Inventor(s) Larry R. James

It is certified that error appears in the above-identified patent and that said Letters Patent are hereby corrected as shown below:

Column 8, line 36, after "inner" insert --- part of said rim portion, said disk and rim portions ---.

Signed and Sealed this

Thirteenth Day of November 1984

[SEAL]

*Attest:*

*Attesting Officer*

GERALD J. MOSSINGHOFF

*Commissioner of Patents and Trademarks*